United States Patent
Weng et al.

(10) Patent No.: US 9,955,463 B2
(45) Date of Patent: Apr. 24, 2018

(54) METHOD AND SYSTEM FOR BATTERY ENERGY SAVINGS FOR CARRIER AGGREGATION

(71) Applicant: BlackBerry Limited, Waterloo (CA)

(72) Inventors: Jianfeng Weng, Kanata (CA); Yiping Wang, Allen, TX (US); Jun Li, Richardson, TX (US)

(73) Assignee: BlackBerry Limited, Waterloo, Ontario (CA)

(*) Notice: Subject to any disclaimer, the term of this patent is extended or adjusted under 35 U.S.C. 154(b) by 290 days.

(21) Appl. No.: 13/666,489

(22) Filed: Nov. 1, 2012

(65) Prior Publication Data
US 2014/0119253 A1    May 1, 2014

(51) Int. Cl.
*H04W 72/04* (2009.01)
*H04W 52/02* (2009.01)
*H04L 5/00* (2006.01)

(52) U.S. Cl.
CPC ........... *H04W 72/042* (2013.01); *H04L 5/001* (2013.01); *H04L 5/0098* (2013.01); *H04W 52/0216* (2013.01); *H04L 5/0044* (2013.01); *H04L 5/0053* (2013.01); *H04W 72/0453* (2013.01); *Y02B 60/50* (2013.01)

(58) Field of Classification Search
None
See application file for complete search history.

(56) References Cited

U.S. PATENT DOCUMENTS

| | | |
|---|---|---|
| 2011/0142002 A1 | 6/2011 | Chapman |
| 2012/0093119 A1* | 4/2012 | Kim et al. ............... 370/329 |
| 2012/0099439 A1* | 4/2012 | Baldemair ........... H04L 5/0044 370/241 |

(Continued)

FOREIGN PATENT DOCUMENTS

| | | |
|---|---|---|
| EP | 2549820 | 1/2013 |
| EP | 2549820 A2 * | 1/2013 |

(Continued)

OTHER PUBLICATIONS

3GPP TS36.300 v.11.3.0, "Evolved Universal Terrestrial Radio Access (E-UTRA) and Evolved Universal Terrestrial Radio Access Network (E-UTRAN); Overall description; Stage 2", Sep. 26, 2012, (206 pages).

(Continued)

*Primary Examiner* — Adnan Baig
(74) *Attorney, Agent, or Firm* — Fish & Richardson P.C.

(57) ABSTRACT

A method at a user equipment having a scheduling carrier and at least one scheduled carrier, the method receiving, at a first subframe from the scheduling carrier, a downlink control indication containing a downlink assignment for the user equipment on the scheduled carrier; and turning on a receiver of the user equipment for the scheduled carrier at a future downlink subframe based on the downlink assignment. Further, a method, at a scheduling cell having a scheduling carrier, for scheduling downlink data reception on a scheduled carrier, the method setting a time skew for the scheduled carrier such that a data transmission start time for a subframe at the scheduled carrier is greater than a blind latency decode time on the scheduling carrier.

18 Claims, 8 Drawing Sheets

(56) References Cited

U.S. PATENT DOCUMENTS

| | | | |
|---|---|---|---|
| 2012/0113941 A1 | 5/2012 | Chung et al. | |
| 2012/0140727 A1 | 6/2012 | Ng | |
| 2012/0263127 A1* | 10/2012 | Moon | H04L 5/001 |
| | | | 370/329 |
| 2013/0279462 A1* | 10/2013 | He | H04W 72/042 |
| | | | 370/329 |

FOREIGN PATENT DOCUMENTS

| | | | | |
|---|---|---|---|---|
| WO | WO 2010051209 A1 * | 5/2010 | | H04W 72/048 |
| WO | 2010088536 | 8/2010 | | |

OTHER PUBLICATIONS

3GPP TS 36.211 V10.5.0: "Evolved Universal Terrestrial Radio Access (E-UTRA); Physical Channels and Modulation", Jun. 2012, (102 pages).

Patent Cooperation Treaty, "International Search Report", issued in connection with PCT application No. PCT/US2012/062982, dated Mar. 22, 2013, 5 pages.

Patent Cooperation Treaty, "Written Opinion", issued in connection with PCT application No. PCT/US2012/062982, dated Mar. 22, 2013, 9 pages.

Canadian Office Action issued in Canadian Application No. 2,888,674 dated Jun. 16, 2016, 3 pages.

Office Action issued in Canadian Application No. 2,888,674 dated Jan. 9, 2017; 4 pages.

Office Action issued in Canadian Application No. 2,888,674 dated Nov. 28, 2017; 4 pages.

* cited by examiner

METHOD AND SYSTEM FOR BATTERY ENERGY SAVINGS FOR CARRIER AGGREGATION

FIELD OF THE DISCLOSURE

The present disclosure relates to cross carrier scheduling for a user equipment (UE) operating in a carrier aggregation environment, and in particular relates to downlink scheduling for a secondary carrier.

BACKGROUND

Carrier aggregation allows a UE to simultaneously receive or transmit on one or more component carriers (CCs). In carrier aggregation, a primary cell (PCell) or another scheduling cell may schedule a UE to listen to the physical downlink shared channel (PDSCH) of a scheduled secondary cell (SCell). The scheduling is done through the use of a physical downlink control channel (PDCCH) at the primary cell or another scheduling cell. Examples of such carrier aggregation are, for example, defined by the Third Generation Partnership Project (3GPP) Long Term Evolution-Advanced (LTE-A) Technical Specification (TS) 36.300, "Evolved Universal Terrestrial Radio Access (E-UTRA) and Evolved Universal Terrestrial Radio Access Network (E-UTRAN); Overall description; Stage 2", v.11.3.0, Sep. 26, 2012, the contents of which are incorporated herein by reference.

With carrier aggregation, a UE may need to monitor the PDCCH on the primary cell or another scheduling cell to determine if the UE should receive and decode the PDSCH of the scheduled secondary cell. However, due to the potential PDCCH decoding latency on deciding whether or not there is any scheduling information for any other CCs being scheduled, the radio, as well as other partial baseband processing (channel estimation, time/frequency tracking loops, transmit fast Fourier transform (FFT), among others) might need to be turned on early in order to capture data samples from the scheduled secondary cell. Such capture could be from the PDSCH start time instant at the component carrier, to the time instant that the PDCCH decoding for the scheduled CC is complete. Specifically, the UE may need to buffer the data on the component carriers until it has decoded the PDCCH to ensure that no downlink data carried by the PDSCH is missed while the PDCCHs are decoded.

The added battery usage to have a radio turned on to a component carrier frequency and to buffer the data causes battery drain on the UE.

BRIEF DESCRIPTION OF THE DRAWINGS

The present disclosure will be better understood with reference to the drawings, in which.

DETAILED DESCRIPTION OF THE DRAWINGS

Figure 1:
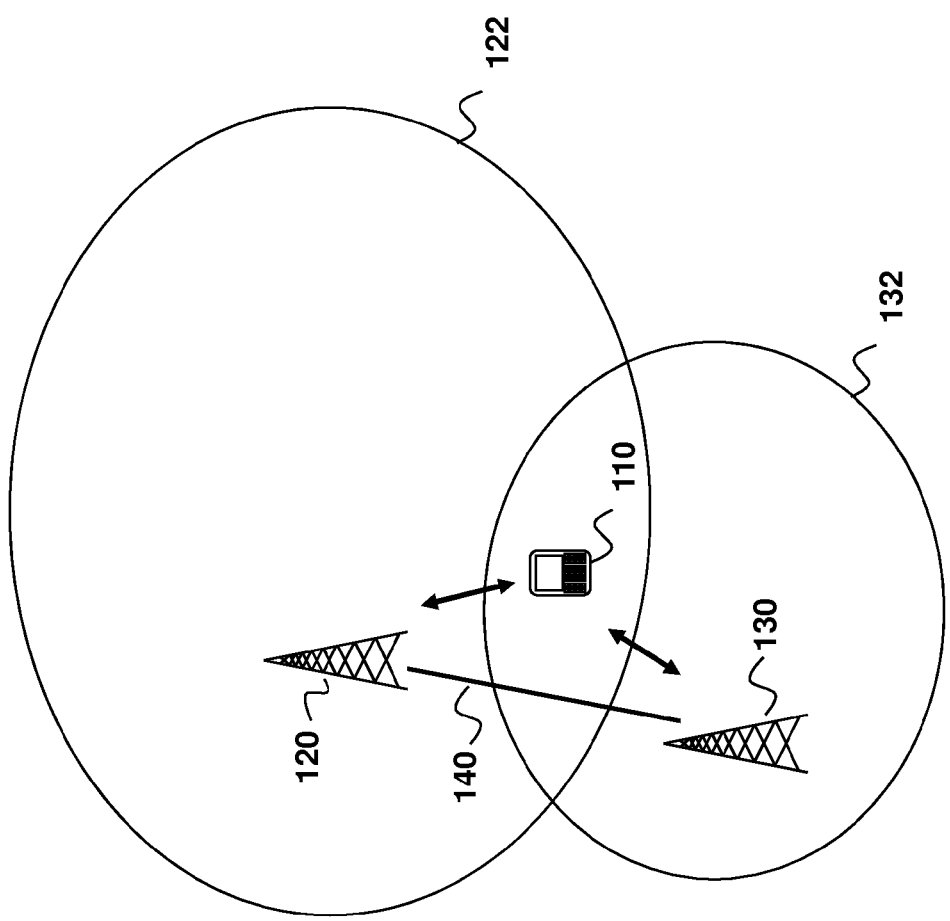
FIG. 1 is a block diagram of an example network distribution for carrier aggregation.

The present disclosure provides a method at a user equipment having a scheduling carrier and at least one scheduled carrier, the method comprising: receiving, at a first subframe from the scheduling carrier, a downlink control indication containing a downlink assignment for the user equipment on the scheduled carrier; and turning on a receiver of the user equipment for the scheduled carrier at a future downlink subframe based on the downlink assignment.

The present disclosure further provides a user equipment having a scheduling carrier and at least one scheduled carrier comprising: a processor; and a communications subsystem; wherein the user equipment is configured to: receive at a first subframe from the scheduling carrier, a downlink control indication containing a downlink assignment for the user equipment on the scheduled carrier; and turn on a receiver of the user equipment for the scheduled carrier at a future downlink subframe based on the downlink assignment.

The present disclosure further provides a method, at a scheduling cell, for scheduling downlink data reception for a scheduled cell, the method comprising, providing an indication to at least one user equipment that downlink assignments for the scheduled cell are for a future downlink subframe.

The present disclosure further provides a network element for scheduling downlink data reception for a scheduled cell, the network element comprising: a processor; and a communications system, wherein the network element is configured to: provide an indication to at least one user equipment that downlink assignments for the scheduled cell are for a future downlink subframe.

The present disclosure further provides a method, at a scheduling cell having a scheduling carrier, for scheduling downlink data reception on a scheduled carrier, the method comprising, setting a time skew for the scheduled carrier such that a data transmission start time for a subframe at the scheduled carrier is greater than a blind latency decode time on the scheduling carrier.

The present disclosure further provides a network element for scheduling downlink data reception for a scheduled carrier, the network element comprising: a processor; and a communications system, wherein the network element is configured to: set a time skew for the scheduled carrier such that a data transmission start time for a subframe at the scheduled carrier is greater than a blind latency decode time on the scheduling carrier.

The present disclosure is described with reference to 3GPP LTE-A. However, the present disclosure is not limited to such a network and other networks could utilize the embodiments described herein. The use of LTE-A is therefore merely exemplary.

The present disclosure relates to carrier aggregation, which allows a user equipment to simultaneously receive or transmit on one or multiple component carriers (CCs). Multiple CCs could be from the same eNB or from different eNBs.

In a frequency division duplex (FDD) system, the number of CCs aggregated in the downlink could be different than that in the uplink and the bandwidths configured for the uplink could also be different from those for the downlink.

For carrier aggregation, there is one independent hybrid acknowledgement receipt request (HARQ) entity per serving cell in each of the uplink or downlink. However, each UE only has one radio resource control (RRC) connection with the network.

The serving cell that handles the RRC connect establishment or re-establishment or handover is referred to as the primary cell. The carrier corresponding to the PCell in the downlink is termed the downlink primary component carrier (DL-PCC), while in the uplink is termed the uplink primary component carrier (UL-PCC).

Other serving cells are referred to as secondary cells (SCells) and their corresponding carriers are referred to as secondary component carriers (SCC).

The carriers could be aggregated intra-band or inter-band. This means that the carriers could be aggregated within the same E-UTRA operating frequency band as the primary carrier or outside of that frequency band.

Thus, for a UE, the configured set of serving cells consists of one primary cell and one or more secondary cells.

The architecture or layout of the primary cells and secondary cells may vary depending on the deployment scenario. For example, various deployment scenarios are shown in Table J.1-1 of 3GPP TS 36.300, v.10.5.0, Oct. 3, 2011, the entire contents of which are incorporated herein by reference.

As shown in the table, various deployment scenarios include co-located and overlaid cells providing nearly the same coverage. In this case, the cells may be within the same operating band and aggregation may be possible between the overlaid cells.

In a second deployment scenario, the cells may be co-located and overlaid, but one group of cells may have a smaller coverage area due to a larger path loss. In this case, the cells with a smaller coverage may be used to improve throughput and the cells may be in different bands.

In the third deployment scenario, the cells may be co-located but one group of cells may be at the cell boundary of the other group of cells so that cell edge throughput is increased.

In a fourth deployment scenario, the first group of cells may provide macro coverage and the second group of cells may be remote radio heads (RRHs) and are used to improve throughput at hot spots.

In a fifth deployment scenario, the cells may be overlaid but frequency selective repeaters may be deployed to extend coverage for one of the carrier frequencies.

One exemplary deployment scenario is shown with regard to FIG. 1. In the embodiment of FIG. 1, a UE 110 is being served by a macro cell 120 with a cell coverage area 122. UE 110 further sees a second cell 130 with a coverage area 132. Cell 130 may, for example, be a small cell such as a remote radio head or a femto cell.

The macro cell 120 may wish to provide for carrier aggregation to allow a higher throughput of data to the UE and thus may schedule cell 130 to become a secondary component carrier. Coordination between cell 120 and cell 130 may be done, for example, through a backhaul 140.

The above are just examples of different deployment scenarios and the present disclosure is not limited by any particular deployment scenario. In the present case, the primary carrier and the secondary carriers are aggregated and the physical deployment of such carriers may affect propagation delays. Otherwise any deployment could be utilized.

For carrier aggregation, as stated in TS 36.300, v.10.5.0, the timing of cells at base stations or eNBs is aligned. The aligned time includes frame timing, subframe number (SFN) and time division duplex (TDD) configuration across cells that can be aggregated.

However, propagation delays exist between different serving cells and such delays are typically different. The reception timing observed at the UE at the physical layer carrying downlink assignments and/or uplink grants for the same subframe from different serving cells could be different. Such difference would not affect the medium access control (MAC) operation. A UE can typically cope with a relatively small propagation delay difference of up to 31.3 microseconds among different carrier components being monitored.

With regard to cross-carrier scheduling, for carrier aggregation, information on the component carriers that a UE needs to monitor is provided by the eNB through MAC and RRC messages. This may help reduce power consumption at a UE, as the UE needs to monitor only the component carriers configured.

For a UE monitoring more than one component carrier, the scheduling information for each subframe is sent on a scheduling carrier. In particular, the scheduling carrier could be a PCell or an SCell. However, only a PCell can schedule itself.

Further, for downlink assignments, after demodulation of the PDSCH at a UE, the corresponding downlink ACK/NACK feedback is transmitted to the PCell by a physical uplink control channel (PUCCH) only transmission or on its own uplink carrier either to the PCell or an SCell if there is a physical uplink shared channel (PUSCH) scheduled. This is the same for FDD and TDD systems.

For uplink grants, the UE will transmit uplink data on PUSCH. After the demodulation of the PUSCH at the eNB, the corresponding uplink ACK/NAK is carried by the physical HARQ indicator channel (PHICH), which is always transmitted from the scheduling carrier. Again, this is the same for both FDD and TDD systems.

In some embodiments, a network can send an RRC configuration message containing CrossCarrierScheduling-Config information element (IE) to further configure the cross-carrier scheduling. The CrossCarrierSchedulingConfig IE may include at least two fields.

A first field is the schedulingCellID which is used to notify a UE of which cell or carrier to monitor the PDCCH. This may be self-scheduling or cross-carrier scheduling, for example.

The CrossCarrierSchedulingConfig IE also may include a pdsch-Start, which indicates the starting orthogonal frequency division multiplexing (OFDM) symbol of the PDSCH for the concerned SCell. Values 1, 2, 3 are applicable when downlink-Bandwidth for the concerned SCell is greater than 10 resource blocks. Values 2, 3, 4 are applicable when the downlink-Bandwidth for the concerned SCell is less than or equal to 10 resource blocks. The pdsch-Start may be treated as a control format indication decoded from a virtual physical control format indicator channel (PC-FICH).

The activation or deactivation of component carriers is done through MAC control elements. For example, such MAC control elements are described in Section 6.1.3.8 of 3GPP TS 36.321, "Evolved Universal Terrestrial Radio Access (E-UTRA); Medium Access Control (MAC) protocol specification", v. 11.0.0, Sep. 24, 2012, the contents of which are incorporated herein by reference.

As a result of receiving the MAC control element, a UE with cross-carrier scheduling and with one or more carriers activated need only monitor the PDCCH on the scheduling cell. There is no need to monitor the PDCCH on the scheduled cell and no need to detect the PCFICH to derive the starting symbol of the PDSCH for the scheduled cell.

However, the UE must blind decode the PDCCH and the blind decoding delay in cross-carrier scheduling may cause issues. Specifically, when the starting point of the scheduled cell PDSCH is at the same time or earlier than the ending point of the PDCCH decoding completion, the carrier aggregated UE in this case, in addition to monitoring and decoding of the PDCCH at the scheduled cell, needs to collect the data at the beginning of the PDSCH of scheduled cell in case such cell is scheduled.

Figure 2:
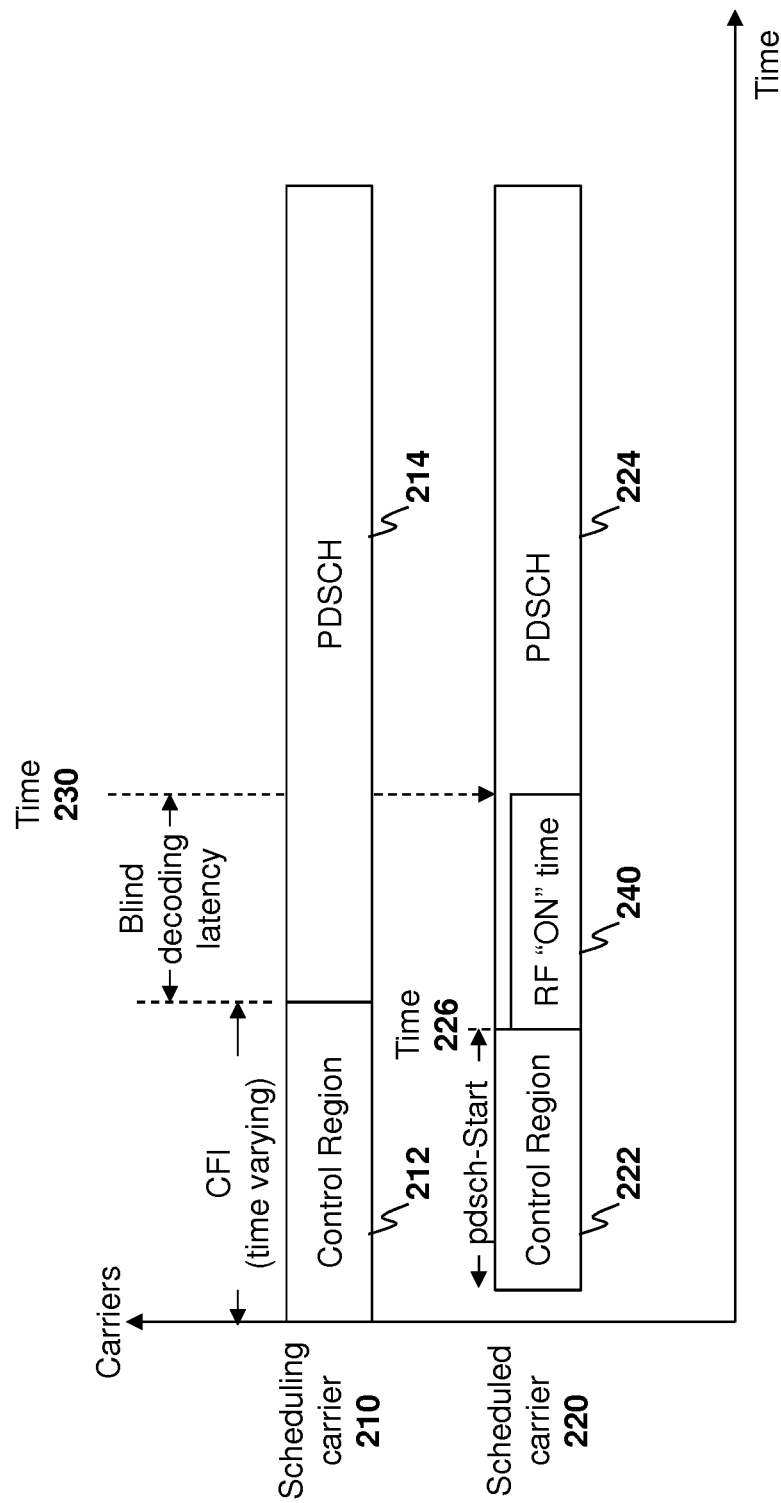
FIG. 2 is a block diagram showing subframe regions for a scheduling carrier and a scheduled carrier.

Reference is now made to FIG. 2. A UE needs to monitor the PDCCH on the scheduling CC. Due to the potential PDCCH decoding latency on deciding whether or not there is any scheduled information for any scheduled component carriers, the radio, as well as other partial base band processing, such as, but not limited to, channel estimation, time/frequency tracking loops, receiver fast Fourier transforms (FFT), among others, may need to be turned on to capture data samples from the "pdsch-Start" to the time instant when the PDCCH decoding for the scheduled CCs is complete.

Thus, in FIG. 2, the scheduling carrier 210 provides a control region 212 and a PDSCH region 214. The UE can start the blind decoding of the PDCCH at the transition between control region 212 and the PDSCH 214. In one embodiment, the PDCCH blind decoding needs to perform at least 44 decoding attempts for one component carrier. In some cases, the UE can arrange the blind decoding for the scheduled CCs earlier. However, it still takes some time. For example, blind decoding may complete approximately 200 microseconds after the ending point of the control region 212 in some embodiments.

Scheduled carrier 220 includes a control region 222 and a PDSCH region 224. In this case, the pdsch-Start time 226 may be at initial boundary between control region 222 and PDSCH 224. Conversely, the time for the blind decoding to be finished, as shown by time 230, may be after the PDSCH start time 226 for scheduled carrier 220.

Thus, as long as the pdsch-Start time 226 at the scheduled component carrier is earlier than the decision time 230 from the PDCCH blind decoding indicating whether or not one scheduled component carrier has any scheduling information for the current subframe, the UE must turn on its radio for the scheduled component carrier from the pdsch-Start time 226 until the end of the blind decoding time 230 to receive the signal and turn on the receiver fast Fourier transform (FFT) processing. Further, normally baseband systems may need to store data samples after the pipelined receiver FFT processing as well.

The UE may in general have a separate RF processing chain for each component carrier. Such RF processing chain may include, for example, a down converter, a phase lock loop (PLL) filtering, analog to digital converter, digital radio frequency packaging, among others.

Thus, as shown in FIG. 2, the RF "ON" time 240 exists to ensure that no data is missed that is scheduled for the UE.

The RF "ON" time is not fixed as it is affected by the time-varying control region on the scheduling carrier and the subframe downlink time alignment between carriers.

It is possible to put a constraint to have a small control region on the scheduling component carrier and a large pdsch-Start value to reduce the time difference between times 226 and 230. In one embodiment, time 230 could be before time 226. However, in some embodiments the constraint to have such ordering of the time may not be appropriate as the scheduling component carrier needs to schedule other component carriers as well and may need more PDCCH room to carry the scheduling information.

Further, UE power-saving oriented eNB scheduling may schedule UEs in burst reception or transmission so that a UE can enter into sleep on one carrier quickly whenever it determines there is no PDCCH for that carrier. That means multiple UEs may time-share the downlink subframe. Coupled with the bursty needs of UEs, the downlink allocation for UEs is likely to be bursty. This means that a UE may need to turn on the RF reception from time 226 to time 230 for all activated component carriers.

If the eNB tries to send MAC messages to activate or deactivate the component carriers so that a UE does not need to monitor the component carriers if they are not scheduled, the MAC message exchanging will be frequent in order to meet bursty needs and further the MAC resources may be costly since too many MAC messages sent over the air occupy extra radio resources.

Accordingly, control of a UE component carrier activation/deactivation list may occur relatively infrequently. Due to the infrequency of the MAC control, the eNB may not schedule for all UEs on all activated component carriers due to competition or sharing from many UEs on the uplink or downlink resources, coupled with time-varying channel conditions. In such case, the UE may need to turn on its radio frequency reception from time 226 to time 230 for all activated component carriers. The larger the number of activated component carriers, the faster the UE battery energy will be drained.

Also, for 3GPP carrier aggregation, existing RRC messaging may be used to configure and reconfigure carriers. The RRC message can add, remove, or reconfigure the secondary cell for the target primary cell in the case of intra-LTE handover. In addition, MAC control elements are used to activate or deactivate one or more component carriers for a UE. When a secondary cell is activated, the UE-specific CrossCarrierSchedulingConfig IE defines the scheduling carrier on which the PDCCH is monitored and the starting point on scheduled cell from which PDSCH is decoded.

However, in 3GPP, the "pdsch-Start" from the RRC configuration message to a UE overrules the control format information (CFI) value on the PCFICH from the scheduled cell. This means that the CFI value on the PCFICH from the scheduled cell may be no larger than the "pdsch-Start" as the PDSCH for carrier-aggregation UEs needs to start from "pdsch-Start", at which time the control region is supposed to end. In cases that the CFI value is less than the "pdsch-Start" and with the PDSCH data on the scheduled cell to the UE, there may be resource elements (REs) not used for the UE. Such REs would be wasted.

Figure 3:
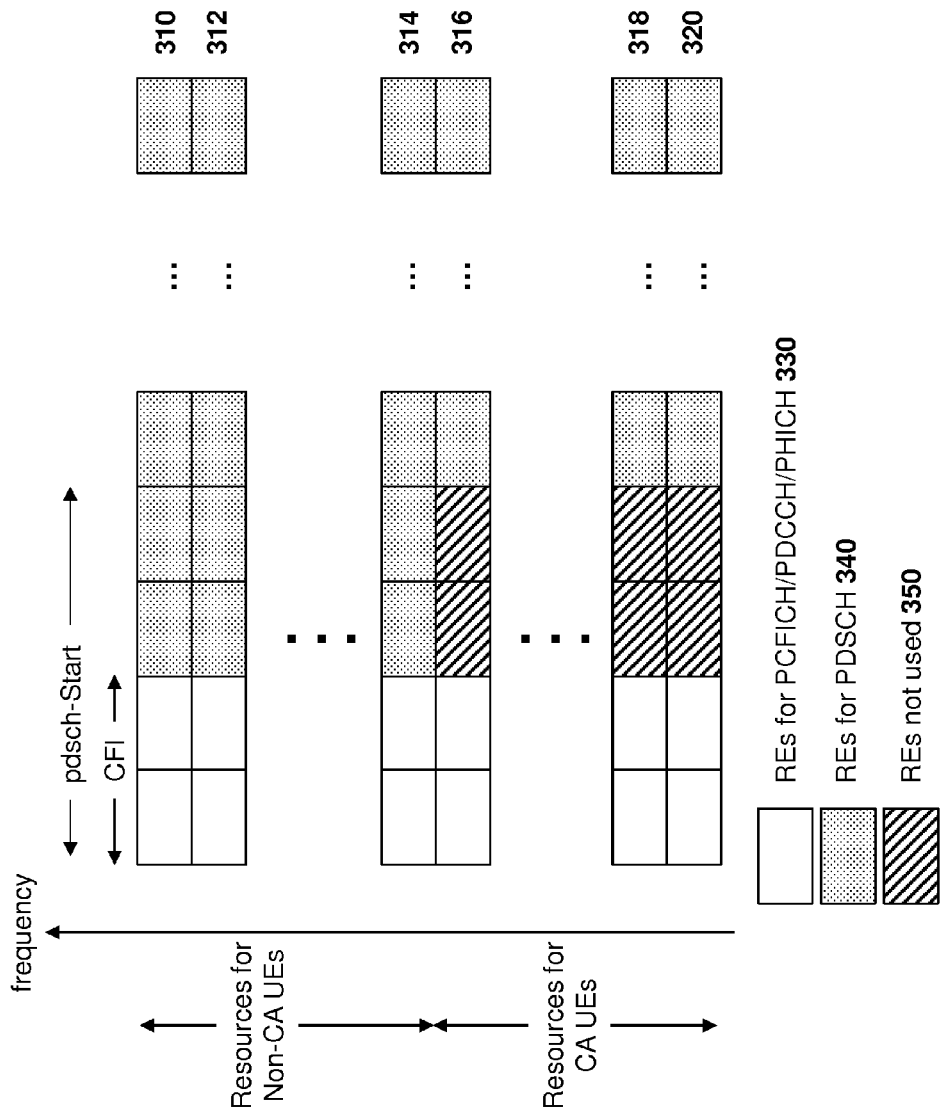
FIG. 3 is a block diagram showing usage of resource elements in a scheduled carrier.

Reference is now made to FIG. 3, which shows various resource elements on different frequencies. In the embodiment of FIG. 3, resource elements 310, 312 and 314 are used for non-carrier aggregation (non-CA) UEs while resources 316, 318 and 320 are used for carrier aggregation (CA) UEs.

As seen in FIG. 3, the REs designated by reference numeral 330 are for PCFICH, PDCCH and PHICH. The resource elements designated by reference numeral 340 are for PDSCH and the resource elements designated by reference numeral 350 are not used.

In the case of the resources for non-carrier aggregation UEs, as shown at blocks 310, 312 and 314, all of the resource elements are used. However, for carrier aggregation UEs, since the CFI value is less than the pdsch-Start value, two resource elements 350 are unused for each of the resources.

Further, to support downlink HARQ, each UE needs to process the data from a subframe "#n" to determine the ACK/NAK and send back the ACK/NAK at subframe "#n+4" with an amount of time advance. The data processing in general includes a receiver FFT processing, resource de-mapping, PDCCH blind decoding, PDSCH decoding to determine ACK/NAK, and transmission processing to modulate the ACK/NAK and transmit.

Figure 4:
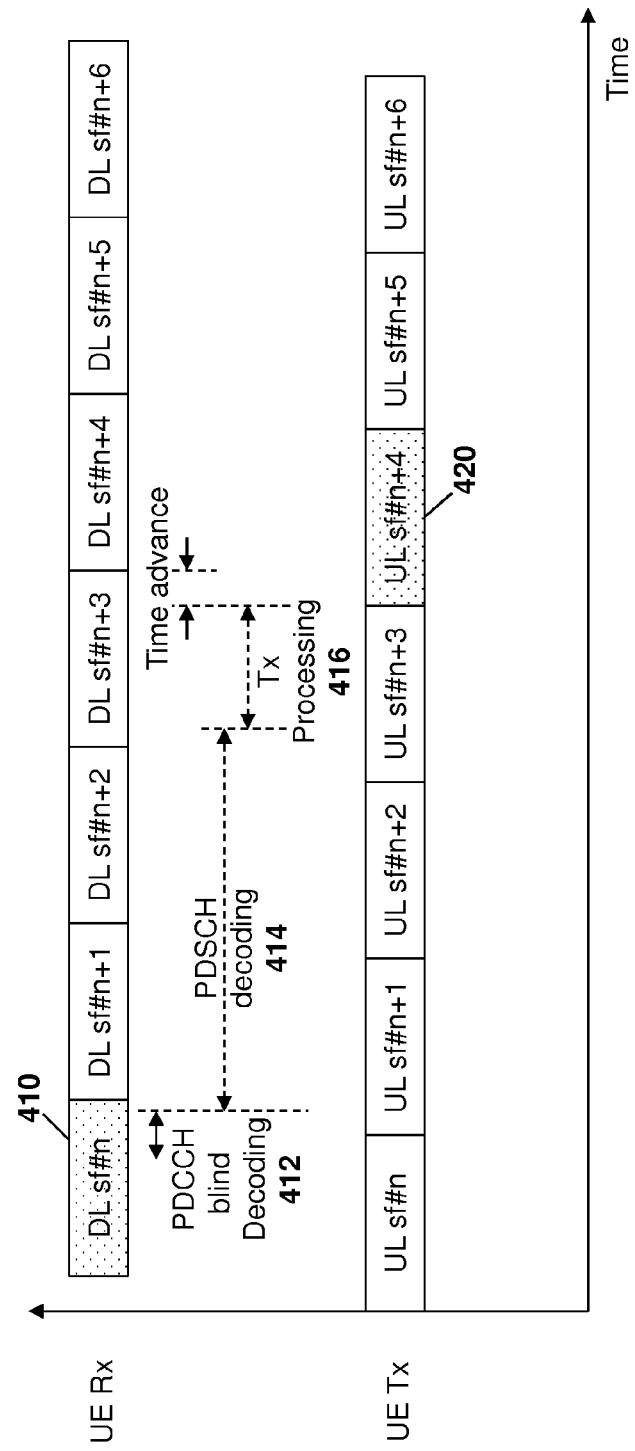
FIG. 4 is a block diagram showing processing time at a user equipment receiver for determining and providing HARQ feedback.

Reference is now made to FIG. 4, which shows as an example the processing time from three major tasks: the PDCCH blind decoding, PDSCH decoding, and transmission processing. A UE with multiple activated CCs will have a much tighter processing time budget since the UE needs to search more PDCCH search spaces and may need to decode more code blocks and prepare for transmissions on multiple component carriers.

Thus, as shown by FIG. 4, a UE receives a downlink subframe #n, as shown by arrow 410, and may perform PDCCH blind decoding, as shown by arrow 412.

Once the blind decoding completes, the PDSCH decoding can start, as shown by arrow 414. Further, the transmission processing needs to then occur as shown by arrow 416 in order to have the HARQ ACK/NAK transmitted in subframe "n+4", as shown at arrow 420. In some embodiments, where a pipe-line processing is arranged, the blind decoding, PDSCH decoding, and transmission processing may overlap.

The embodiment of FIG. 4 illustrates an FDD system. In a TDD system, a different subframes than "n+4" may be used for the uplink transmission.

Based on FIG. 4, enough time is needed at the UE to perform the decoding and transmission processing to be able to send an ACK/NAK in the appropriate uplink subframe.

In order to overcome the battery drain issues, the present disclosure provides for various embodiments. In one embodiment, the present disclosure provides for cross-carrier future subframe scheduling. In a further embodiment, the present disclosure provides for a time-skewed downlink transmission from eNBs. Each is discussed below.

Cross-Carrier Future Subframe Scheduling

In accordance with one embodiment, a new scheduling feature is provided, such that the scheduling on the scheduled carrier is for the next available downlink subframe. In other words, the scheduling is not for the concurrent subframe aligned with the scheduling carrier, as outlined in FIG. 2, but for the next available downlink subframe. In this way, carrier aggregation UEs in one subframe does not need to turn on RF reception for the scheduled carrier unless an earlier scheduling for the scheduled carrier and for the current subframe had occurred.

At the next available downlink subframe, the scheduling information for the scheduled carrier may be overridden if needed.

Figure 5:
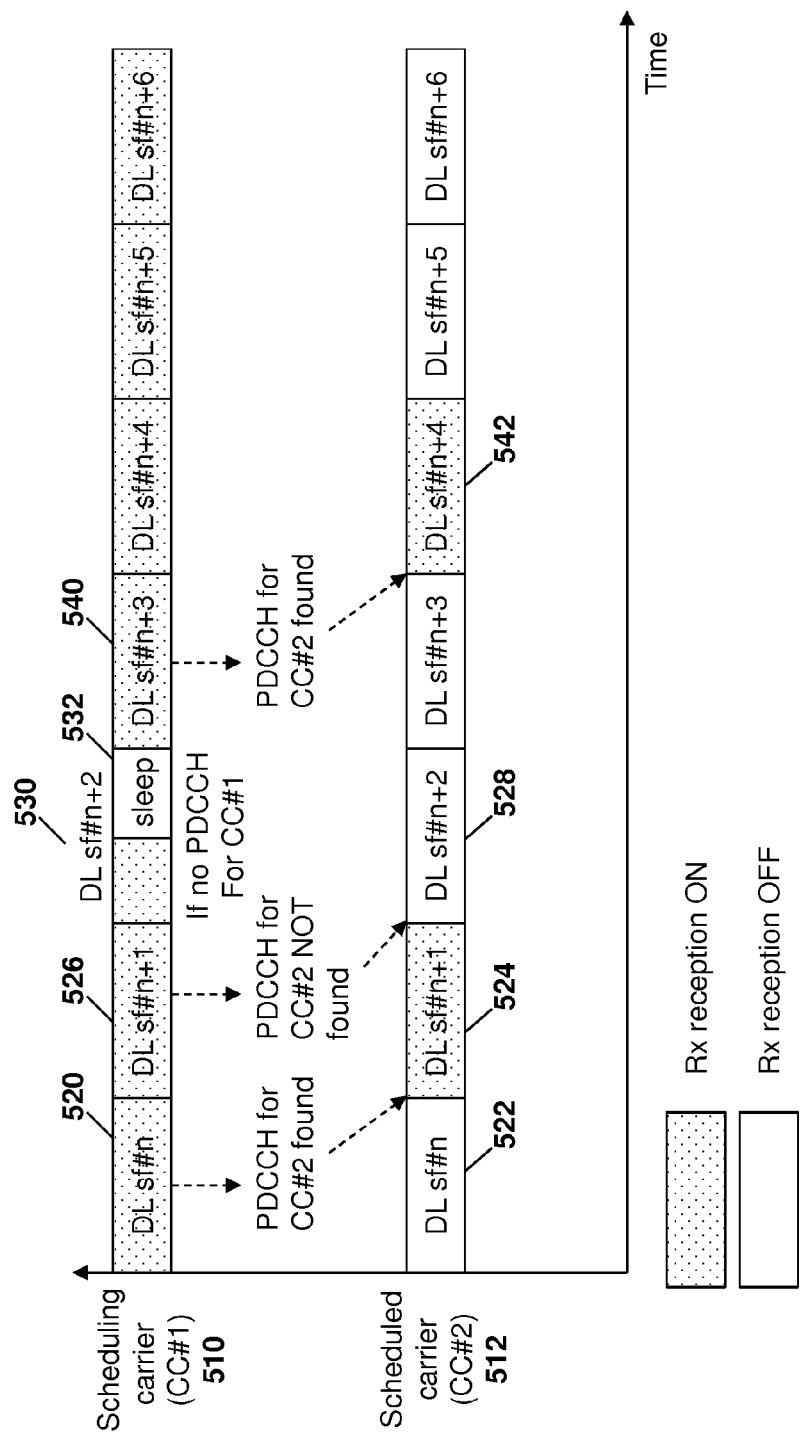
FIG. 5 is a block diagram showing cross carrier future subframe scheduling.

Reference is now made to FIG. 5. In the embodiment of FIG. 5, the PDCCH scheduling for the scheduled carriers, which is detected on a scheduling carrier at subframe "n", is for the next available downlink subframe. For FDD, the next available downlink subframe is "n+1". For TDD, the next available downlink subframe may be in a subframe other than "n+1" but the subframe is still the next available downlink subframe, which the UE will be aware of as the UE knows the TDD uplink/downlink configuration.

Thus, as seen in FIG. 5, a scheduling carrier 510 provides scheduling for a scheduled carrier 512.

At downlink subframe "n" as shown by reference numeral 520, a PDCCH for the scheduled carrier 512 is found. In this case, under the prior solutions the downlink subframe "n" on the scheduled carrier 512, as shown by arrow 522, would have been scheduled. However, in accordance with one embodiment of the present disclosure, instead downlink subframe "n+1", as seen by reference numeral 524, is scheduled. A UE would therefore turn on the receiver and communications subsystem for scheduled carrier 512 at subframe n+1.

For subframe "n+1", shown by reference numeral 526, there is no PDCCH detected for scheduled carrier 512, and therefore the UE may leave its receiver and communications subsystem for the scheduled carrier off at subframe "n+2", shown by reference numeral 528.

As seen in subframe "n+2", shown by reference numeral 530, if there is no detected PDCCH for the scheduling carrier 510, a short sleep cycle may be entered in for the scheduling carrier, as shown by reference numeral 532.

Similarly, at downlink subframe "n+3" on scheduling carrier 510, as shown by reference numeral 540, the scheduling occurs for the next downlink subframe for scheduled carrier 512. Thus, the UE turns on its radio for the scheduled carrier 512 at subframe "n+4", as shown by reference numeral 542.

As seen on scheduled carrier 512, the UE turns its radio off for unscheduled subframes, thereby saving battery power.

In one embodiment, RRC signaling is used to turn off and on the feature of next subframe scheduling. Thus, no additional bit or bits are needed in the downlink control information (DCI) to indicate which subframe the scheduling is for.

In other words, the UE receives a message from the network on RRC signaling indicating that future scheduling will be for the next subframe or will start at a specified frame. The UE will assume that the scheduling configuration is thereafter maintained until the feature is turned off through RRC signaling.

In accordance with one embodiment, ACK/NAK timing is not changed. In other words, when data is transmitted on scheduled carrier 512 in subframe "n+1", the UE will then transmit an ACK/NAK at subframe "n+5" for an FDD configuration (and the appropriate subframe relative to subframe "n+1" for a TDD configuration).

Further, since the PUCCH resource for the ACK/NAK on the scheduled cell 512 PDSCH is indicated through the ACK/NAK resource indicator (ARI) bits and higher level configuration, there will be no collision with ACK/NAKs for the scheduling carrier 510 at subframe "n+5", since such ACK/NAKs are scheduled by PDCCH with a subframe "n+1".

The RRC message that is used to turn off or on the feature may be broadcast so it applies to an entire cell. It may also be sent in a dedicated message to a particular UE so that the scheduling configuration only applies to that UE.

If the feature is off, any scheduling information received on subframe "n" is for subframe "n". If the feature is on, scheduling information for a scheduled carrier received from the scheduling carrier at subframe "n" is for the next downlink subframe on the scheduled carrier.

Further, when cross carrier subframe scheduling is on, the pdsch-Start may not be needed as the UE knows in advance it needs to turn on its receiver reception for the next available subframe.

In some embodiments the pdsch-Start may be provided with an unused value as an indicator to turn on the feature.

For example, for LTE with a channel bandwidth of 1.4 MHz, the unused value is 4. The other three values in the set {1,2,3} as currently defined by 3 GPP TS36.331-a60 are used and they indicate the number of OFDM symbols carrying the control information. For other LTE channel bandwidths, the unused value may be 1, while the other three values in the set {2,3,4} as currently defined by 3GPP TS36.331-a60 are used and they indicate the number of OFDM symbols carrying the control information. The feature can be turned off if "pdsch-Start" is set to any value from the set {1,2,3} for 1.4 MHz or from the set {2,3,4} for LTE channel bandwidth larger than 1.4 MHz.

Further, once "pdsch-Start" is set to the unused value, which may be 4 for the downlink channel bandwidth of 1.4 MHz or 1 for the downlink channel bandwidth larger than 1.4 MHz, the UE may decode the PCFICH on the next available subframe on the scheduled carrier that the UE needs to receive in order to obtain the time duration for the control region. As such, the UE knows the PDSCH start time and it no longer needs "pdsch-Start" for that.

One advantage of this is that the control region length on the scheduled carriers is free to change at any subframe. Otherwise, the control region length would be no larger than the "pdsch-Start".

Scheduling done on subframe "n" can be overridden at subframe "n+1" when needed if the UE is now triggered to turn on reception at subframe "n+1" on a scheduled carrier and the UE can read the PDCCH again on the scheduled carrier at subframe "n+1". This may be implemented without introducing any additional indicator as the overwriting assignment is detected from the PDCCH on the scheduled carrier, and the normal scheduling is cross-carrier scheduling from another carrier.

While the above is described with regards to scheduling the next available downlink subframe on the scheduled carrier, in one embodiment the scheduling may be for a different subframe. For example, the scheduling may be for two subframes in the future. Thus, according to FIG. 5, the PDCCH as subframe "n" in scheduling carrier 510 could schedule subframe "n+2" in scheduling carrier 512. Other examples are possible.

The above therefore provides for future subframe scheduling for a scheduled carrier. The embodiments apply to both FDD and TDD systems and further apply to both inter-band and intra-band scheduling.

Time-Skewed Downlink Transmission from eNBs

In an alternative embodiment, battery energy at the UE may be saved through the time-skew between component carriers of an eNB.

In particular, for the same subframe, the subframe boundary of the scheduling carriers may be ahead of that of the scheduled carriers such that the PDSCH starts at a time instant on the scheduled carriers and that time instant is later than the worst-case PDCCH decoding time from the scheduling carrier.

Figure 6:
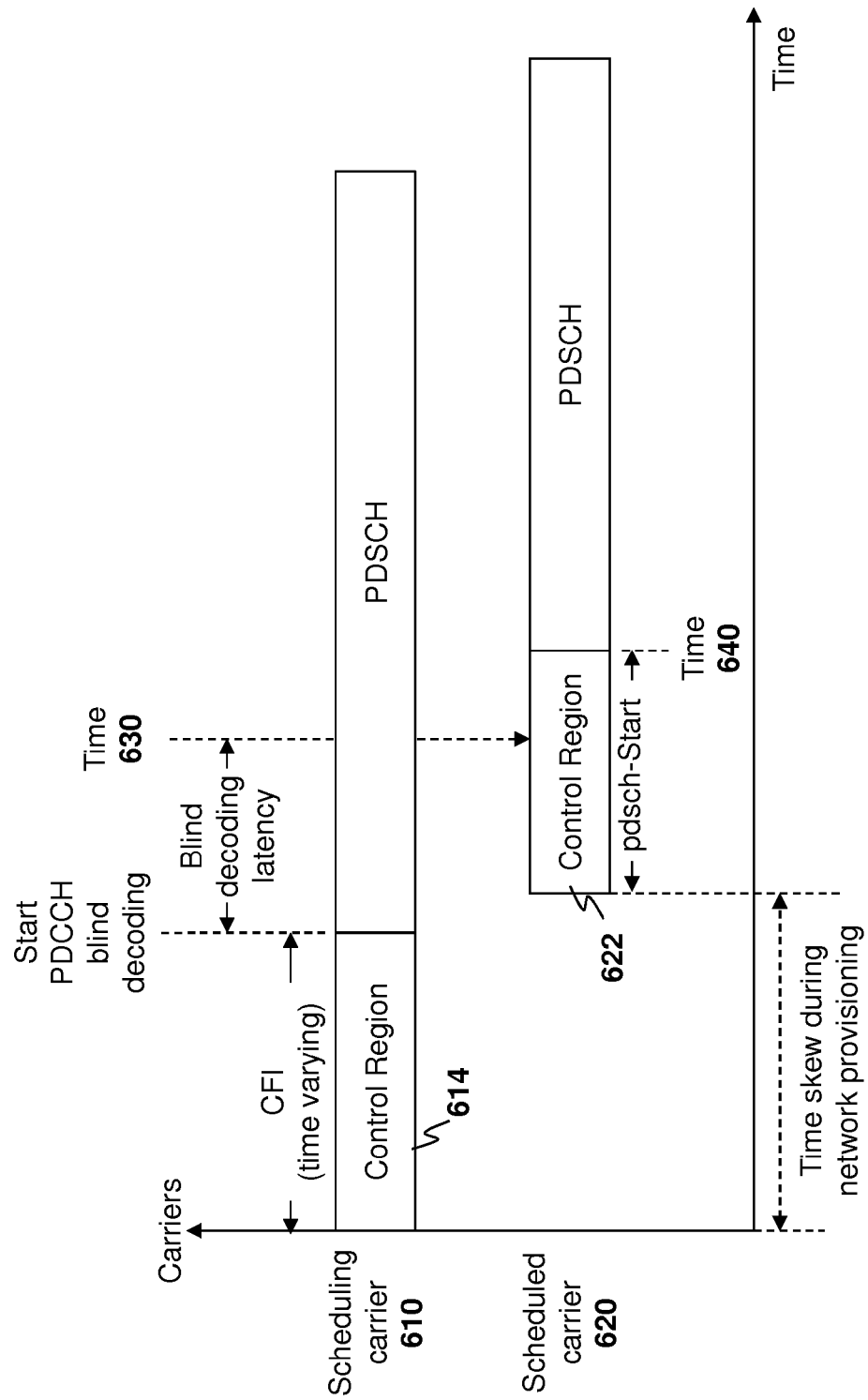
FIG. 6 is a block diagram showing an example of a time-skewed downlink transmission between a scheduling carrier and a scheduled carrier.

This is, for example, illustrated in FIG. 6. As seen in FIG. 6, scheduling carrier 610 has a time-skew 612 with scheduled carrier 620.

At the end of the control region 614 there is a blind decoding of the PDCCH, which finishes at time 630. As long as the time 630 is before the pdsch-Start time 640, (at the end of control region 622 in the embodiment of FIG. 6) then there is no need to turn on the receiver and perform processing prior to that time.

In one embodiment, a UE configured to support more than one carrier, the UE may need to check the potential PDCCH targeted for one or more scheduled carriers in order to know earlier if it needs to turn on the radio frequency reception for the scheduled carriers.

In this embodiment, all carrier aggregation UEs may be configured to have the same scheduling carrier.

Further, due to time skew, the HARQ processing time budget on scheduled carriers may be shorter if a UE needs to decode the PDSCH from a scheduled carrier which starts late but corresponds to subframe "n" on the scheduling carrier, but sends a downlink ACK/NAK on the scheduling carrier so that it can arrive at subframe "n+4".

A UE is designed to operate in a cell with radius up to 100 km, for which a corresponding time advance may be $2\times(100 \text{ km}/3\times10^8 \text{ m/second})\times10^6 \text{ } \mu s/\text{second}=667 \text{ } \mu s$. This amount of time advance is included in the UE processing time budget.

If a UE moves closer to the base station and is, for example, within 3 km of the base station it only needs 20 us for the time advance. The UE can have 667−20=647 μs of processing time free. This may be used to accommodate the time-skewed carriers.

In other words, assume that by design, each carrier aggregation capable UE can support a peak data rate of P Mbps up to a cell radius of R km. This peak rate is reached when all carriers are enabled.

Then, a trade-off between the peak rate, amount of time-skew and the maximum cell radius may be made at the eNB. That is, if all UEs can support a peak rate of P Mbps for cell radius of up to 100 km (a corresponding time advance is 667 us), when there is a time skew of 367 μs between the scheduling carrier and other scheduled carriers, UEs with the time advance of less than 667−367=300 μs, which implies a cell radius of 50 km, can still support the peak rate.

The time advance adjustment commands are from the eNB to each UE, so the eNB may estimate the time advance used by each UE and schedule each UE accordingly. For a time skew of 367 μs between the scheduling carrier and other scheduled carriers, the eNB can select UEs with the time advance≤300 μs for carrier aggregation and schedule them to support up to the peak rate of P Mbps. UEs with the time advance of >300 us can also be scheduled for carrier aggregation, but their peak rate may need to be scaled back from the peak rate of P Mbps so that those UEs can still meet their processing time budget. The amount of scaling back can be built up by testing UE capabilities to determine the processing time versus the peak rate supported.

The primary cells and secondary cells may be any network element. A simplified network element is shown with regard to FIG. 7.

Figure 7:
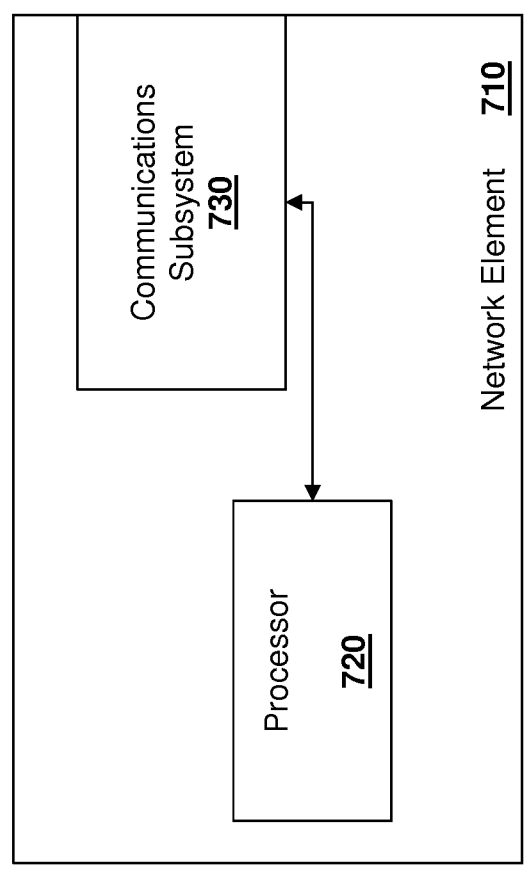
FIG. 7 is a simplified block diagram of an example network element.

In FIG. 7, network element 710 includes a processor 720 and a communications subsystem 730, where the processor 720 and communications subsystem 730 cooperate to perform the methods described above.

Further, the above may be implemented by any UE. One exemplary device is described below with regard to FIG. 8.

UE 800 is typically a two-way wireless communication device having voice and data communication capabilities. UE 800 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 800 is enabled for two-way communication, it may incorporate a communication subsystem 811, including both a receiver 812 and a transmitter 814, as well as associated components such as one or more antenna elements 816 and 818, local oscillators (LOs) 813, and a processing module such as a digital signal processor (DSP) 820. As will be apparent to those skilled in the field of communications, the particular design of the communication subsystem 811 will be dependent upon the communication network in which the device is intended to operate. The radio frequency front end of communication subsystem 811 can be any of the embodiments described above.

Network access requirements will also vary depending upon the type of network 819. In some networks network access is associated with a subscriber or user of UE 800. A UE may require a removable user identity module (RUIM) or a subscriber identity module (SIM) card in order to operate on a network. The SIM/RUIM interface 844 is normally similar to a card-slot into which a SIM/RUIM card can be inserted and ejected. The SIM/RUIM card can have memory and hold many key configurations 851, and other information 853 such as identification, and subscriber related information.

Figure 8:
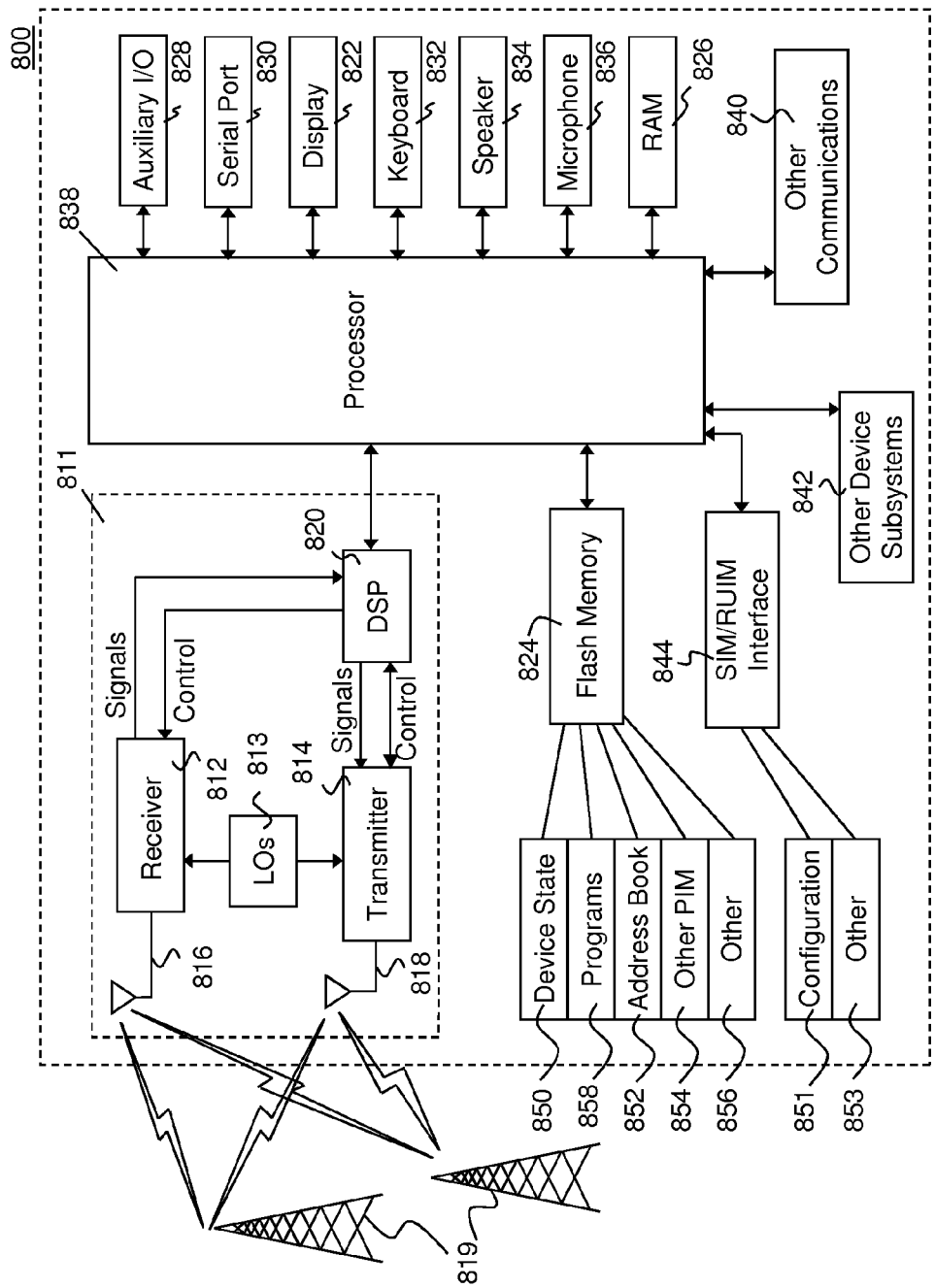
FIG. 8 is a block diagram of an example user equipment.

When required network registration or activation procedures have been completed, UE 800 may send and receive communication signals over the network 819. As illustrated in FIG. 8, network 819 can consist of multiple base stations communicating with the UE.

Signals received by antenna 816 through communication network 819 are input to receiver 812, which may perform such common receiver functions as signal amplification, frequency down conversion, filtering, channel selection and the like. ND conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog conversion, frequency up conversion, filtering, amplification and transmission over the communication network 819 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

UE 800 generally includes a processor 838 which controls the overall operation of the device. Communication functions, including data and voice communications, are performed through communication subsystem 811. Processor 838 also interacts with further device subsystems such as the display 822, flash memory 824, random access memory (RAM) 826, auxiliary input/output (I/O) subsystems 828, serial port 830, one or more keyboards or keypads 832, speaker 834, microphone 836, other communication subsystem 840 such as a short-range communications subsystem and any other device subsystems generally designated as 842. Serial port 830 could include a USB port or other port known to those in the art.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list.

Operating system software used by the processor 838 may be stored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. Processor 838, in addition to its operating system functions, may enable execution of software applications on the UE. A predetermined set of applications that control basic operations, including at least data and voice communication applications for example, will normally be installed on UE 800 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 819. Further applications may also be loaded onto the UE 800 through the network 819, an auxiliary I/O subsystem 828, serial port 830, short-range communications subsystem 840 or any other suitable subsystem 842, and installed by a user in the RAM 826 or a non-volatile store (not shown) for execution by the processor 838. Such flexibility in application installation increases the functionality of the device and may provide enhanced on-device functions, communication-related functions, or both. For example, secure communication applications may enable electronic commerce functions and other such financial transactions to be performed using the UE 800.

In a data communication mode, a received signal such as a text message or web page download will be processed by the communication subsystem 811 and input to the processor 838, which may further process the received signal for output to the display 822, or alternatively to an auxiliary I/O device 828.

A user of UE 800 may also compose data items such as email messages for example, using the keyboard 832, which may be a complete alphanumeric keyboard or telephone-type keypad, among others, in conjunction with the display 822 and possibly an auxiliary I/O device 828. Such composed items may then be transmitted over a communication network through the communication subsystem 811.

For voice communications, overall operation of UE 800 is similar, except that received signals would typically be output to a speaker 834 and signals for transmission would be generated by a microphone 836. Alternative voice or audio I/O subsystems, such as a voice message recording subsystem, may also be implemented on UE 800. Although voice or audio signal output is generally accomplished primarily through the speaker 834, display 822 may also be used to provide an indication of the identity of a calling party, the duration of a voice call, or other voice call related information for example.

Serial port 830 in FIG. 8 would normally be implemented in a personal digital assistant (PDA)-type UE for which synchronization with a user's desktop computer (not shown) may be desirable, but is an optional device component. Such a port 830 would enable a user to set preferences through an external device or software application and would extend the capabilities of UE 800 by providing for information or software downloads to UE 800 other than through a wireless communication network. The alternate download path may for example be used to load an encryption key onto the device through a direct and thus reliable and trusted connection to thereby enable secure device communication. As will be appreciated by those skilled in the art, serial port 830 can further be used to connect the UE to a computer to act as a modem.

Other communications subsystems 840, such as a short-range communications subsystem, is a further optional component which may provide for communication between UE 800 and different systems or devices, which need not necessarily be similar devices. For example, the subsystem 840 may include an infrared device and associated circuits and components or a Bluetooth™ communication module to provide for communication with similarly enabled systems and devices. Subsystem 840 may further include non-cellular communications such as WiFi, WiMAX, or near field communications (NFC).

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment having a scheduling carrier and at least one scheduled carrier, the method comprising:
   receiving a first higher layer indication from the scheduling carrier to turn on future downlink subframe scheduling for each of the at least one scheduled carrier;
   when future downlink subframe scheduling is turned on:
   receiving, at a first subframe from the scheduling carrier, a first downlink control indication containing a first downlink assignment for the user equipment on a selected carrier of the at least one scheduled carrier;
   turning on a receiver of the user equipment for the selected carrier at a future downlink subframe based on the first downlink assignment;
   receiving a second higher layer indication from the scheduling carrier to turn off future downlink subframe scheduling for each of the at least one scheduled carrier;
   when future downlink subframe scheduling is turned off:
   receiving, at a second subframe from the scheduling carrier, a second downlink control indication containing a second downlink assignment for the user equipment on the selected carrier; and
   turning on the receiver of the user equipment for the selected carrier during the second subframe based on the second downlink assignment;
   wherein the first higher layer indication is distinct from the first downlink control indication.

2. The method of claim 1, wherein the future downlink subframe is the next available downlink subframe.

3. The method of claim 1, wherein the higher layer indication is sent over radio resource control or medium access control signaling.

4. The method of claim 1, wherein an unused value in a CrossCarrierSchedulingConfig IE pdsch-Start field is used for the higher layer signaling.

5. The method of claim 1, further comprising receiving, on a downlink control indication of the selected carrier, at the future downlink subframe, an indication to override the existing downlink assignment.

6. A user equipment having a scheduling carrier and at least one scheduled carrier comprising:
   a processor; and
   a communications subsystem;
   wherein the user equipment is configured to:
   receive a first higher layer indication from the scheduling carrier to turn on future downlink subframe scheduling for each of the at least one scheduled carrier;
   when future downlink subframe scheduling is turned on:
   receive at a first subframe from the scheduling carrier, a first downlink control indication containing a first downlink assignment for the user equipment on a selected carrier of the at least one scheduled carrier;
   turn on a receiver of the user equipment for the selected carrier at a future downlink subframe based on the first downlink assignment;
   receive a second higher layer indication from the scheduling carrier to turn off future downlink subframe scheduling for each of the at least one scheduled carrier;
   when future downlink subframe scheduling is turned off:
   receive, at a second subframe from the scheduling carrier, a second downlink control indication containing a second downlink assignment for the user equipment on the selected carrier; and
   turn on the receiver of the user equipment for the selected carrier during the second subframe based on the second downlink assignment;
   wherein the first higher layer indication is distinct from the first downlink control indication.

7. The user equipment of claim 6, wherein the future downlink subframe is the next available downlink subframe.

8. The user equipment of claim 6, wherein the higher layer indication is sent over radio resource control or medium access control signaling.

9. The user equipment of claim 6, wherein an unused value in a CrossCarrierSchedulingConfig IE pdsch-Start field is used for the higher layer signaling.

10. The user equipment of claim 6, further configured to receive, on a downlink control indication of the selected carrier, at the future downlink subframe, an indication to override the existing downlink assignment.

11. A method, at a scheduling cell, for scheduling downlink data reception for a scheduled cell, the method comprising,
    providing a first indication to at least one user equipment that downlink assignments on any carrier of at least one scheduled carrier for the scheduled cell are for future downlink subframes;
    when future downlink subframe scheduling is turned on:
    transmitting a first downlink assignment to the at least one user equipment on a selected carrier of the at least one scheduled carrier;

determining a future downlink subframe;

transmitting data corresponding to the first downlink assignment during the future downlink subframe on the selected carrier;

providing a second indication to the at least one user equipment that downlink assignments on any carrier of the at least one scheduled carrier for the scheduled cell are for a current downlink subframe;

when future downlink subframe scheduling is turned off:

transmitting a second downlink assignment to the at least one user equipment on the selected carrier;

transmitting data corresponding to the second downlink assignment during the current downlink subframe on the selected carrier;

wherein the first indication is distinct from the first downlink assignment.

12. The method of claim 11, wherein the first indication is sent over radio resource control or medium access control signaling.

13. The method of claim 12, wherein an unused value in a CrossCarrierSchedulingConfig IE pdsch-Start field is used for the first indication.

14. The method of claim 11, wherein the future downlink subframe is the next downlink subframe after the downlink assignment.

15. A network element for scheduling downlink data reception for a scheduled cell, the network element comprising:

a processor; and a communications system, wherein the network element is configured to:

provide a first indication to at least one user equipment that downlink assignments on any carrier of at least one scheduled carrier for the scheduled cell are for future downlink subframes;

when future downlink subframe scheduling is turned on:

transmit a first downlink assignment to the at least one user equipment on a selected carrier of the at least one scheduled carrier;

determine a future downlink subframe;

transmit data corresponding to the first downlink assignment during the future downlink subframe on the selected carrier;

provide a second indication to the at least one user equipment that downlink assignments on any carrier of the at least one carrier for the scheduled cell are for a current downlink subframe;

when future downlink subframe scheduling is turned off:

transmit a second downlink assignment to the at least one user equipment on the selected carrier;

transmit data corresponding to the second downlink assignment during the current downlink subframe on the selected carrier;

wherein the first indication is distinct from the first downlink assignment.

16. The network element of claim 15, wherein the first indication is sent over radio resource control or medium access control signaling.

17. The network element of claim 16, wherein an unused value in a CrossCarrierSchedulingConfig IE pdsch-Start field is used for the first indication.

18. The network element of claim 15, wherein the future downlink subframe is the next downlink subframe after the downlink assignment.

* * * * *